(12) United States Patent
Baldwin et al.

(10) Patent No.: US 10,205,940 B1
(45) Date of Patent: Feb. 12, 2019

(54) DETERMINING CALIBRATION SETTINGS FOR DISPLAYING CONTENT ON A MONITOR

(71) Applicant: Amazon Technologies, Inc., Seattle, WA (US)

(72) Inventors: Leo Benedict Baldwin, San Jose, CA (US); Nicholas Ryan Gilmour, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 85 days.

(21) Appl. No.: 14/571,023

(22) Filed: Dec. 15, 2014

(51) Int. Cl.
| | |
|---|---|
| *H04N 17/04* | (2006.01) |
| *H04N 17/02* | (2006.01) |
| *H04N 17/00* | (2006.01) |
| *H04N 5/225* | (2006.01) |
| *H04N 21/41* | (2011.01) |
| *H04N 21/4223* | (2011.01) |

(52) U.S. Cl.
CPC .......... *H04N 17/04* (2013.01); *H04N 5/2257* (2013.01); *H04N 17/002* (2013.01); *H04N 17/02* (2013.01); *H04N 21/4126* (2013.01); *H04N 21/4223* (2013.01)

(58) Field of Classification Search
None
See application file for complete search history.

(56) References Cited

U.S. PATENT DOCUMENTS

| | | | |
|---|---|---|---|
| 2007/0028026 A1* | 2/2007 | Yeh | G11B 27/034 711/4 |
| 2008/0062164 A1* | 3/2008 | Bassi | H04N 9/3147 345/214 |
| 2008/0150883 A1 | 6/2008 | Tokuyasu | |
| 2008/0297451 A1 | 12/2008 | Marcu | |
| 2010/0032546 A1 | 2/2010 | Kawano et al. | |
| 2011/0045773 A1* | 2/2011 | Yu | G06F 13/385 455/41.2 |
| 2011/0285746 A1 | 11/2011 | Swic | |

(Continued)

OTHER PUBLICATIONS

Office action for U.S. Appl. No. 14/571,039, dated Dec. 1, 2015, Baldwin, "Determining Calibration Settings for Displaying Content on a Monitor" (13 pages).

(Continued)

*Primary Examiner* — Samira Monshi
(74) *Attorney, Agent, or Firm* — Lee & Hayes, PLLC

(57) ABSTRACT

Technologies are described herein for determining calibration settings for displaying content on a monitor. A user may use a mobile computing device to determine calibration settings for a monitor. A calibration tool on the mobile computing device causes one or more calibration images to be displayed on the monitor. The calibration images are used to determine settings related to gamma, brightness, contrast, color settings, and the like that are associated with the monitor. After a calibration image is displayed, the calibration tool utilizes a camera on the mobile computing device to capture an image of the calibration image. The calibration tool analyzes the captured image data to determine calibration settings for the monitor. The calibration tool may apply the calibration settings directly to the monitor or might adjust image data before the image data is displayed.

20 Claims, 7 Drawing Sheets

(56) References Cited

U.S. PATENT DOCUMENTS

| | | | | |
|---|---|---|---|---|
| 2012/0147157 A1* | 6/2012 | Wu | .................... | H04N 13/0497 348/56 |
| 2013/0050504 A1* | 2/2013 | Safaee-Rad | .............. | G09G 5/02 348/181 |
| 2013/0050703 A1* | 2/2013 | Shannon | ................. | G01J 3/465 356/402 |
| 2013/0293574 A1* | 11/2013 | Marten | ................. | G09G 3/006 345/629 |
| 2013/0336583 A1* | 12/2013 | Ernst | .................... | G06T 7/0018 382/165 |
| 2014/0085524 A1* | 3/2014 | Berglund | ................. | G09G 5/00 348/333.01 |

OTHER PUBLICATIONS

Huang, et al., "Dynamic Image Pre-Compensation for Computer Access by Individuals with Ocular Aberrations", 34th Annual International Conferece of the IEEE EMBS, San Diego, CA, 2012, pp. 3320-3323.

"New CalMAN AutoCal Automatic Video Calibration," YouTube.com, Published on: Apr. 5, 2013, retrieved on Jul. 15, 2015 from <<https://www.youtube.com/watch?v=mWK_R4B7970>>, 4 pages.

Office action for U.S. Appl. No. 14/571,039, dated Dec. 1, 2015, Baldwin, "Determining Calibration Settings for Displaying Content on a Monitor", 13 pages.

Office action for U.S. Appl. No. 14/571,039, dated Jun. 7, 2016, Baldwin, "Determining Calibration Settings for Displaying Content on a Monitor", 18 pages.

Office action for U.S. Appl. No. 14/571,039, dated Jan. 13, 2017, Baldwin, "Determining Calibration Settings for Displaying Content on a Monitor", 20 pages.

\* cited by examiner

DETERMINING CALIBRATION SETTINGS FOR DISPLAYING CONTENT ON A MONITOR

BACKGROUND

Today, users take pictures and videos using a variety of different devices. For example, a user may take images (e.g., pictures or videos), with a portable computing device, such as a smartphone, a tablet or a camera. These captured images might be stored on the device and/or at some other location. For example, the images might be stored by a network data store or a storage service that is accessible over a network. In some cases, the user may view the images on a display of the portable computing device that took the images or the user might view the images on another video display. For instance, the user might view the images on a television monitor or on some other monitor. The monitor used to view the images, however, might not be calibrated properly. Viewing the images on a monitor that is not calibrated properly may lead to an unacceptable viewing experience for the user.

Television monitors, video and home theater projectors, and computer monitors may include a number of settings to adjust color, brightness, contrast, gamma, and the like. Adjusting these different settings to calibrate a monitor, however, can be challenging. For example, in order to calibrate a monitor, a user might purchase an expensive monitor calibration accessory or play a calibration disk in order to calibrate the monitor. When the calibration disk is played, a series of test patterns may be displayed and verbal instructions may be provided to aid the user in calibrating a monitor. In other cases, a user might adjust one or more of the settings of the monitor until the picture on the monitor is acceptable.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
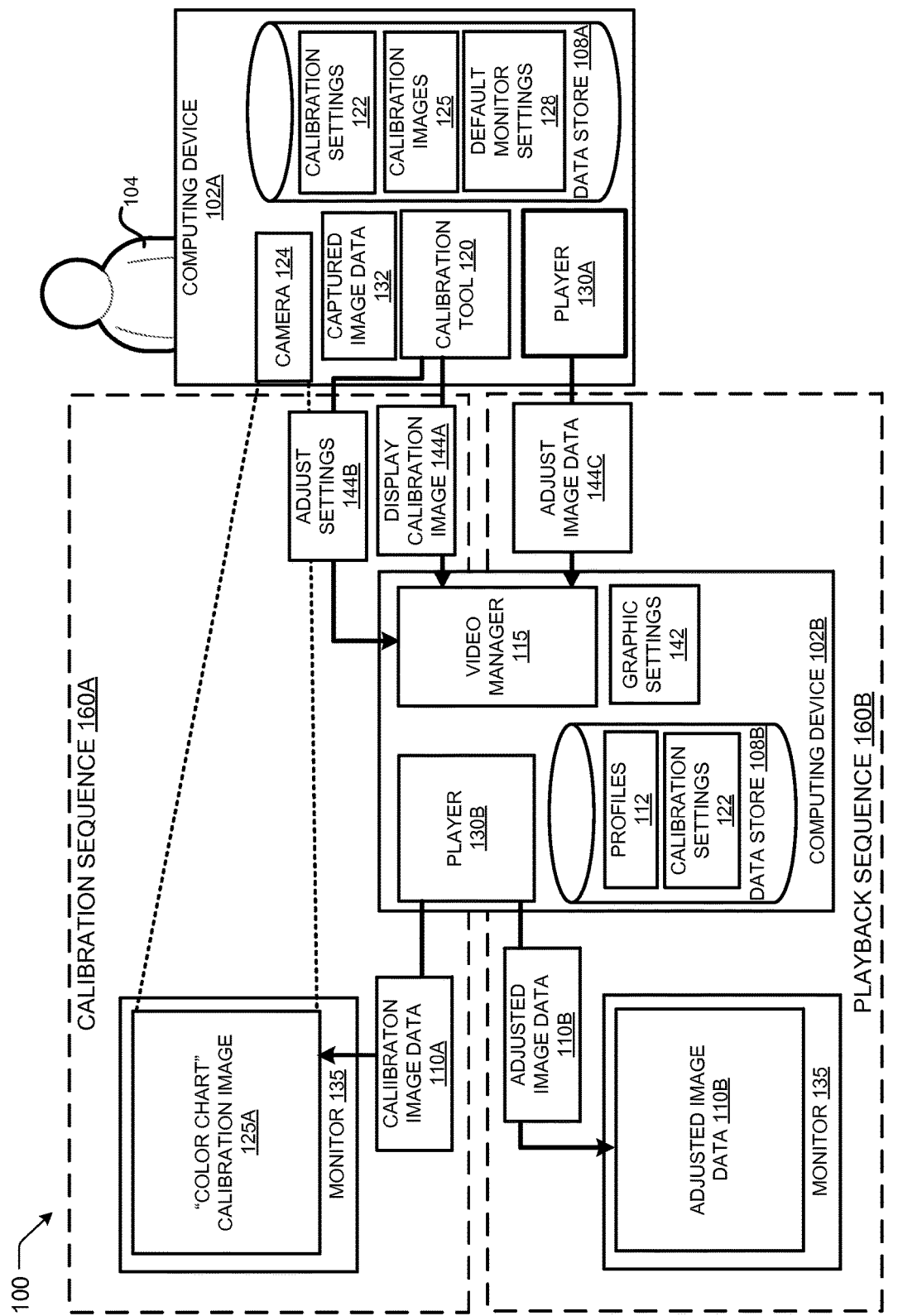
FIG. 1 is a system diagram showing an illustrative operating environment for determining calibration settings for displaying content on a monitor.

The following detailed description is directed to technologies for determining calibration settings for displaying content on a monitor. Utilizing the technologies described herein, a user may use a computing device, such as a mobile computing device, to determine calibration settings for a particular monitor. In some examples, the mobile computing device includes a calibration tool that is used to determine calibration settings for the monitor. The particular monitor to be calibrated might be associated with another computing device, a television, a projector or some other type of display device.

In some configurations, the calibration tool on the mobile computing device causes one or more calibration images to be displayed on the monitor. For example, the calibration tool might instruct another computing device (e.g., a set-top box or a streaming device), to display a series of calibration images on the monitor. The calibration images might be used to determine calibration settings related to gamma, brightness, contrast, sharpness, color settings (e.g., saturation or tint), and the like that are associated with the monitor.

According to some examples, the mobile computing device communicates with the monitor and/or another computing device over a wireless network. For example, the mobile computing device might wirelessly connect with one or more other computing devices over a near-field network (e.g., Bluetooth®), or a Wi-Fi network. In other examples, the mobile computing device might utilize wired connections to communicate with other devices.

To start the calibration process, a user might select a user interface ("UI") element displayed by the calibration tool. In other examples, the calibration process might start in response to the calibration tool detecting the use of an un-calibrated monitor. During the calibration process, a user may point a camera of the mobile computing device at the monitor to capture the displayed calibration image. In some examples, the calibration tool causes the camera to capture images of one or more test patterns associated with the calibration images in response to a user selecting a UI element or selecting a hardware interface (e.g., a button). In other examples, the calibration tool programmatically instructs the camera to capture images of the calibration images.

The calibration tool may analyze all or a portion of the captured images to determine one or more calibration settings associated with the display of content on the monitor. For example, the calibration tool might determine a gamma setting that may be used to adjust the gamma for the monitor using a "gamma" calibration image. Similarly, the calibration tool might determine color settings that may be used to adjust the monitor using a "color chart" calibration image. Other captured calibration images might be used to determine other calibration settings that may be used to adjust the monitor. For instance, a "contrast" calibration image might be utilized to determine contrast settings that may be used to adjust the contrast of the monitor. Other calibration images might be associated with calibration settings relating to sharpness, gradient, black-levels, white saturation, aspect ratio, scaling, resolution, and the like. According to some configurations, the calibration tool displays and analyzes the captured images sequentially. In other configurations, all or a portion of the calibration images used for determining the calibration settings might be displayed at the same time on the monitor.

The calibration tool might directly or indirectly apply the calibration settings to the data being displayed. In some configurations, the calibration tool transmits a command to the monitor, or another computing device, to change one or more hardware graphics settings associated with the determined calibration settings. For example, the calibration tool may transmit a command to a streaming device or a set-top box, to adjust one or more of the hardware graphics settings associated with the calibration settings.

In other configurations, instead of actually changing the hardware graphics settings of the hardware used to display the images (e.g., a projector), the calibration tool might cause a programmatic adjustment or correction to be applied to images before the images are displayed on the monitor. For example, the calibration tool, or some other module or component, might de-emphasize gamma by applying a negative gamma correction factor to an image before the image is displayed on a television monitor. Removing gamma from an image before the image is displayed may help compensate for the higher gamma that is typically associated with and applied by a television monitor. Similarly, the calibration tool might use the determined calibration settings to adjust for other characteristics associated with the images. In some examples, the gamma, brightness, contrast, color (e.g., saturation or tint), as well as other characteristics, of the images might be emphasized or de-emphasized before images are displayed on the monitor. For instance, before an image is displayed on a television monitor, the calibration tool might de-emphasize the gamma, contrast, tint, and color saturation before the image is displayed on the television monitor. In some examples, the de-emphasis of the gamma, contrast and color saturation is applied to the image to account for the extra emphasis many television monitors may apply to images.

According to some examples, the calibration tool might generate one or more calibration profiles. Different calibration profiles may be associated with viewing different types of image data or different viewing conditions. For example, one calibration profile might relate to viewing photographs, another calibration profile might relate to viewing television content, another calibration profile might relate to viewing movie content in a brightly lit environment, another calibration profile might relate to viewing movie content in a dimly lit environment, and the like.

At some point, the user, or some other user, selects content (e.g., one or more images) for display on the monitor. As briefly discussed above, the determined calibration settings may be used to adjust the monitor, the video output of a computing device, or used to adjust the images before the images are displayed on the monitor. In some examples, the calibration settings that are selected to be applied to the display of content on a monitor, are based on the type of content being displayed and/or the type of monitor being used. For example, a photograph profile might be utilized when photographs are being displayed on the monitor. Additional examples related to determining calibration settings used for displaying content on a monitor are described below. The techniques discussed herein may be implemented in many different ways, by many different systems. Various representative implementations are provided below with reference to the figures.

FIG. 1 is a system diagram showing an illustrative operating environment 100 for determining calibration settings for displaying content on a monitor. The environment 100 includes a computing device 102A utilized by a user 104 to determine calibration settings 122 that may be utilized for displaying content on a monitor 135. The computing device 102A may be a smartphone, a tablet, or any other computing device 102 capable of performing the technologies described herein. The computing devices 102A and 102B illustrated in FIG. 1 might execute a number of software modules in order to perform operations described herein. The modules may consist of a number of subcomponents executing on one or more computing devices. The monitor 135 might be associated with another computing device, a television, a projector or some other type of display device.

The user 104 may use a module executing on the computing device 102A, such as a calibration tool 120, to determine the calibration settings 122 for the monitor 135. According to some configurations, the user 104 might initiate a calibration sequence 160A by pressing a physical actuator (not shown) on the computing device 102A, selecting a UI element associated with the calibration tool 120, or performing some other action (e.g., speech, gesture).

The calibration tool 120 may capture images using an image capture device, such as a camera 124, which may be capable of recording single still images, sequences of still images, and/or video. While only one camera 124 is shown, the computing device 102A may be configured with more than one camera in some configurations (e.g., 2, 3, or 4). In some examples, the camera 124 may be operative to capture two-dimensional ("2D") or three-dimensional ("3D") images, 2D or 3D videos, and the like.

The calibration tool 120 may have access to a data store 108 that may store image data, such as calibration images 125, calibration settings, such as the calibration settings 122 and default monitor settings 128. The default monitor settings 128 may include data that identifies the default graphics settings used by the monitor 135. For example, the default gamma setting used by the monitor 135 may be set to +2.2 whereas another type of monitor might have a default gamma setting of +2.0, or some other value. Other graphics settings might also be determined for the monitor (e.g., sharpness, color saturation, or color tint). The default monitor settings 128, or in some cases, the current monitor settings, might be used by the calibration tool 120 to determine how to adjust the image data. For example, the calibration tool 120 may determine a gamma setting to apply to image data to be displayed on the monitor 135 to de-emphasize the gamma applied by the monitor 135 when the adjusted image data 110B is displayed.

In some examples, the calibration images 125 and/or other data might be stored in a network data store (not shown). As discussed briefly above, the calibration images 125 might include different calibration images that include different test patterns that are used to determine the calibration settings 122 for the monitor 135.

As discussed above, the calibration tool 120 causes one or more calibration images 125 to be displayed on the monitor 135 being calibrated. For example, the calibration tool 120 might transmit the display calibration image command 144A to the computing device 102B (e.g., a set-top box or a streaming device), to display a series of calibration images 125 at different times, or possibly the same time, on the monitor 135. In some examples, the calibration tool 120 obtains one or more of the calibration images 125 from a network data store (not shown). For example, the computing device 102A might connect to a network service to obtain all or a portion of the calibration images 125. As discussed in more detail below, the calibration images 125 might be used to determine calibration settings 122 related to gamma, brightness, contrast, color (e.g., saturation or tint), and the like that are associated with the monitor 135.

According to some configurations, the computing device 102A communicates with the monitor 135 and/or the computing device 102B over a wireless network (not shown). For example, the computing device 102A may communicate with the computing device 102B over Bluetooth or a Wi-Fi network. In other examples, the computing devices 102A and 102B and/or the monitor 135 might utilize wired connections to communicate.

As briefly discussed above, the user 104 might select a UI element displayed by the calibration tool 120 to initiate the calibration sequence 160A. In other examples, the calibration sequence 160A might start in response to the calibration tool 120, or some other component, detecting an un-calibrated monitor. For example, the calibration tool 120 may detect that a new monitor has been connected to a network used by the computing device 102A.

After the calibration sequence 160A has been initiated, the calibration tool 120 causes one or more of the calibration images 125 to be displayed on the monitor 135. In the current example, the calibration tool 120 causes a "color chart" calibration image 125A to be displayed on the monitor 135 by transmitting the display calibration image command 144A to the video manager 115 on the computing device 102B. In another example, the calibration image 125A might be directly transmitted to the monitor 135 for display. The color chart calibration image 125A might be used by the calibration tool 120 to determine one or more color settings (e.g., color saturation, color tint, or color temperature) for the monitor 135. As discussed in more detail below, other calibration images may be displayed on the monitor 135 before, after, or in combination with the display of the color chart calibration image 125A.

After the calibration image 125A is displayed on the monitor 135, the calibration tool 120 receives captured image data 132 associated with a captured image of the color chart calibration image 125A. For example, the user 104 may point the camera 124 at the monitor 135 during the calibration sequence 160A to capture the displayed calibration image 125A and possibly other calibration images 125. Generally, the user attempts to capture the entire displayed calibration image. In some examples, the calibration tool 120 causes the camera 124 to capture images of the displayed calibration image. In other examples, the user 104 may select a UI element or selecting a hardware interface (e.g., a button) to capture an image of the calibration image 125A.

The calibration tool 120, or some other module or component that is located on the computing device 102A, or some other device may analyze the captured image data 132 to determine one or more calibration settings 122 that may be utilized to adjust the display of content on the monitor 135. Generally, the calibration tool 120 performs image processing on the captured image data 132 to determine whether the calibration image 125 is displayed correctly on the monitor 135. For example, the calibration tool 120 might determine color settings that may be used to adjust the monitor 135 using the captured image data 132 that is associated with the displayed "color chart" calibration image 125A. In some configurations, the calibration tool 120 compares the captured image data 132 to the image data of the "color chart" calibration image 125A to determine differences between the images. For example, the calibration tool 120 may determine whether each color (e.g., shades of grey or different colors that are displayed in color bands of the calibration image 125A) of the "color chart" calibration image 125A is discernible within the captured image data 132. For example, if a first color of a first color band in the captured image data 132 is substantially the same as a second color of a second color band in the captured image data 132 then the first color band is not discernible from the second color band. If the individual shades are not discernible within the captured image data 132, the calibration tool 120 may adjust the associated calibration setting. In some examples, the calibration tool 120 re-displays the calibration image 125 with the adjusted calibration setting applied to the calibration image.

Figure 2:
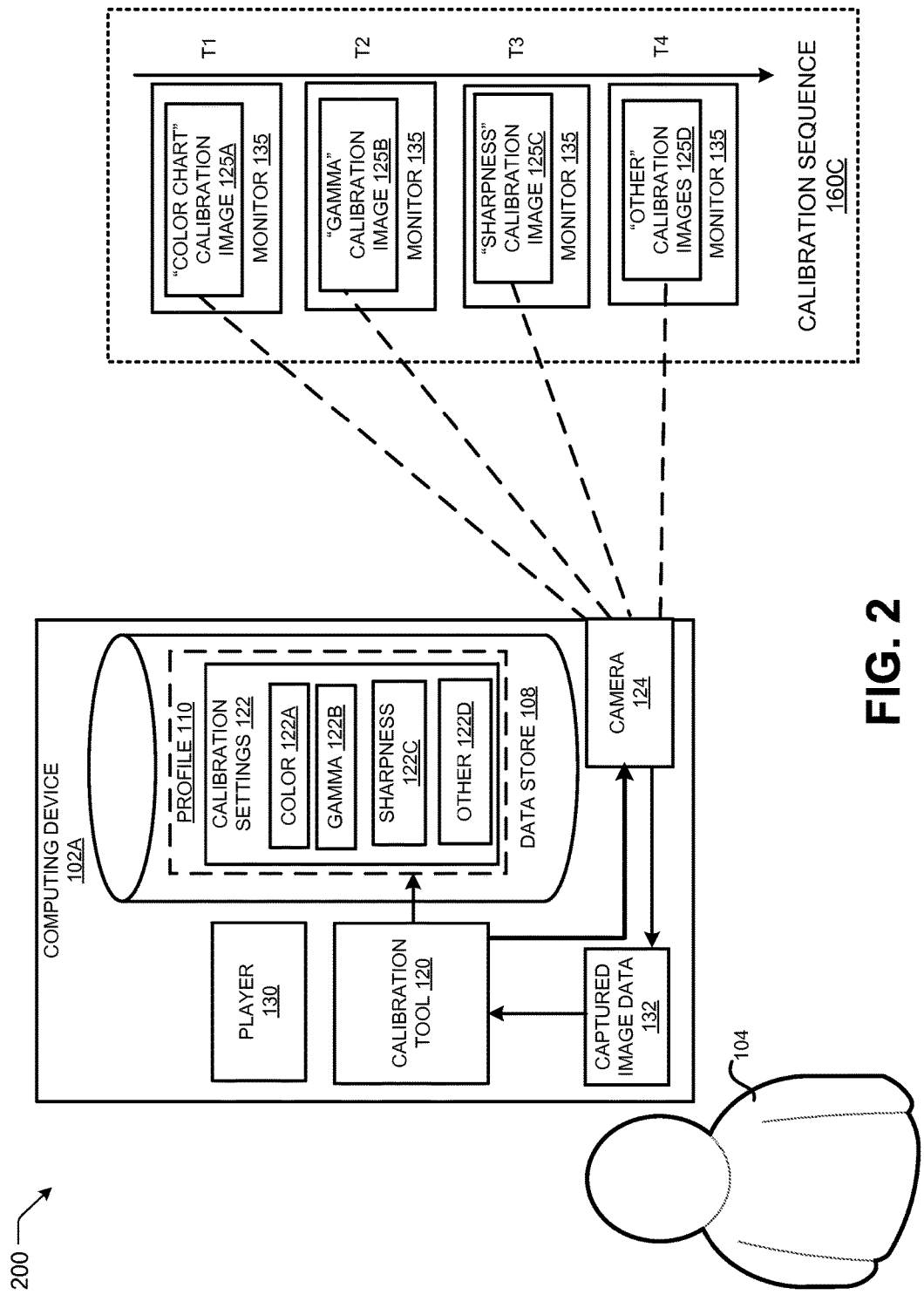
FIG. 2 is a block diagram that shows an example calibration sequence performed using a mobile computing device.

As discussed in more detail with regard to FIG. 2, the calibration tool 120 may cause other calibration images 125 to be displayed that are used to determine other calibration settings 122 associated with the monitor 135. For instance, the calibration tool 120 may cause different calibration images 125 to be displayed that are associated with determining calibration settings 122 associated with gamma, contrast, sharpness, gradient, black-levels, white saturation, color saturation, and the like of the monitor 135.

According to some configurations, the calibration tool 120 analyzes the captured image data 132 associated with a currently displayed calibration image 125 before causing another calibration image 125 to be displayed (i.e., different calibration settings 122 are determined sequentially). In other configurations, the calibration tool 120 may be configured to analyze the captured image data 132 associated with all or a portion of the calibration images 125 displayed during the calibration sequence 160A. In still other configurations, the calibration tool 120 may display more than one calibration image 125 on the monitor 135 at the same time.

The calibration tool 120 may store the determined calibration settings 122 in the data store 108A, or at some other location (e.g., the data store 108B). In some configurations, the calibration tool 120 associates the values of the calibration settings 122 determined from the calibration sequence 160A with one or more calibration profiles 112. The calibration profiles 112 might be stored in the data store 108B associated with the computing device 102B as illustrated, or in another data store.

Different calibration profiles 112 may be associated with viewing different types of image data 110 or different viewing conditions. For example, one calibration profile 112 might relate to viewing photographs, another calibration profile 112 might relate to viewing television content, another calibration profile 112 might relate to viewing movie content in a brightly lit environment, another calibration profile 112 might relate to viewing movie content in a dimly lit environment, and the like.

The calibration tool 120 might directly or indirectly apply the calibration settings 122. For example, the calibration tool 120 might cause one or more hardware graphic settings of the monitor 135 to be directly adjusted based on one or more of the determined calibration settings 122. In some configurations, the calibration tool 120 transmits an "adjust settings" command 144B to the computing device 102B to change one or more of the graphic settings 142 relating to the display of content on the monitor 135. In some examples, the graphic settings 142 are associated with a graphics-processing unit ("GPU") of a computing device, such as the computing device 102A-102B and/or the monitor 135.

Generally, a GPU is a specialized electronic circuit designed to accelerate the creation of images in a frame buffer intended for output to a display, such as the monitor 135. GPUs may be used in computer devices, such as computing device 102A, computing device 102B and possibly within the monitor 135. A GPU might be included on a motherboard, in a CPU, on a separate card, or at some other location within a computing device. In some examples, graphic settings associated with the GPU might be programmatically set. For example, the computing device 102A might transmit a command to the video manager 115 to change a gamma setting used by the GPU on the computing device 102B. In other examples, the computing device 102A may transmit a command to the monitor 135 that adjusts one or more graphics settings 142 of a GPU associated with the monitor 135.

The graphics settings 142 are used by the computing device 102A when displaying content on the monitor 135. In some examples, the graphics settings 142 are hardware graphic settings that may be the same or similar to the calibration settings 122. For example, a gamma calibration setting 122 might correspond to a gamma graphic setting 142 utilized by the computing device 102B. As discussed, the graphics settings 142 might be used by a GPU of a computing device. Some example graphic settings 142, include, but are not limited to brightness, contrast, gamma, color hue, color saturation, color temperature, color tint, resolution, scaling, dynamic range, edge enhancement (e.g., provide higher contrast around lines and objects), noise reduction, antialiasing (e.g., minimizing jagged edges), and the like.

In other configurations, the calibration tool 120 transmits the adjust settings command 144B directly to the monitor 135 to change one or more settings. In the current example, the video manager 115 may change one or more hardware graphics settings 142 that affect the display of content output by the computing device 102B. For example, the hardware graphic settings 142 may be used by a GPU of the computing device 102B when outputting content for display.

In other configurations, instead of actually changing the settings of the monitor 135, the calibration tool 120, or the player 130, might cause a programmatic adjustment or correction to be applied to image data 110 during a playback sequence 160B. In some configurations, the player 130, the calibration tool 120, or some other module or component, might transmit an "adjust image data" command 144C to the computing device 102B instructing the video manager 115 on the computing device 102B to adjust the image data 110 before it is displayed by the monitor 135. For example, the video manager 115 might use the calibration settings 122 determined during the calibration sequence 160A to remove gamma (e.g., apply a gamma correction factor) from the image data 110 before the image data 110 is displayed on the monitor 135. After the image data 110 is adjusted by the video manager 115, or some other component or device, the player 130 outputs the adjusted image data 110B for display on the monitor 135. Similarly, the calibration tool 120 might use the determined calibration settings 122 to adjust for other characteristics associated with the image data 110. For example, the gamma, brightness, contrast, color, as well as other characteristics, of the image data 110 might be adjusted before being displayed on the monitor 135.

According to some configurations, the calibration tool 120, the player 130, the video manager 115 or some other component may select calibration settings 122 that are to be applied based on the type of image data 110 being displayed. For example, a photograph profile might be selected by the video manager 115 when the image data 110 being displayed on the monitor 135 are photographic images. For instance, the calibration tool 120 may determine that the user has accessed pictures from a data store to be displayed on the monitor 135. In some configurations, the user 104 might utilize a user interface (not shown) to adjust the determined calibration settings 122. More details for determining calibration settings for displaying content on a monitor are provided below.

FIG. 2 is a block diagram that shows an example calibration sequence performed using a mobile computing device. As shown in FIG. 2, the computing device 102A includes the calibration tool 120 that is configured to perform operations relating to the capturing of the calibration images 125A-125D and analyzing the captured image data 132 to determine the calibration settings 122 that may be used with the monitor 135.

During the calibration sequence 160A, the computing device 102A, utilizing the calibration tool 120 and the camera 124, may capture image data 132 for each of the different calibration images 125A-125D that are displayed on the monitor 135. As discussed above, one or more calibration images 125 might be utilized during the calibration sequence 160C.

In the example shown in FIG. 2, the calibration sequence 160C displays calibration images at different times. At time T1, the calibration tool 120 causes a "color chart" calibration image 125A to be displayed on the monitor. After the color chart calibration image 125A is displayed, the camera 124 captures an image of the color chart calibration image 125A displayed on the monitor 135. In some configurations, the calibration tool 120 uses the captured image data 132 associated with the color chart calibration image 125A to determine one or more color calibration settings 122A. For example, the one or more color calibration settings 122A might include settings for color saturation, color hue, color brightness, and the like.

At time T2, the calibration tool 120 causes a "gamma" calibration image 125B to be displayed on the monitor. After the gamma calibration image 125B is displayed, the camera 124 captures an image of the gamma calibration image 125B displayed on the monitor 135. In some configurations, the calibration tool 120 uses the captured image data 132 associated with the gamma calibration image 125B to determine one or more gamma settings 122B.

At time T3, the calibration tool 120 causes a "sharpness" calibration image 125C to be displayed on the monitor 135. After the sharpness calibration image 125C is displayed, the camera 124 captures an image of the sharpness calibration image 125C displayed on the monitor 135. In some configurations, the calibration tool 120 uses the captured image data 132 associated with the sharpness calibration image 125C to determine one or more sharpness settings 122C.

At time T4, one or more other calibration images 125D may be displayed on the monitor 135. After the other calibration images 125D are displayed, the camera 124 captures an image of the other calibration images 125D displayed on the monitor 135. In some configurations, the calibration tool 120 uses the captured image data 132 associated with the other calibration images 125D to determine one or more other settings 122D. For example, the other settings 122D might relate to gradient, black-levels, white saturation, color saturation, and the like.

In the example shown in FIG. 2, the camera 124 is continuously capturing image data (e.g., frames) during the calibration sequence 160C at some frame rate (e.g., 1 frame/sec, 30 frames/sec). In other examples, the camera 124 may be configured to capture an image in response to an instruction from the calibration tool 120 and/or the user 104. For example, the calibration tool 120 may cause the camera 124 to capture one or more images at times T1, T2, T3, and T4.

In some configurations, the calibration tool 120 analyzes the image data 132 as it is received from the camera 124. For example, the calibration tool 120 receives and analyzes the captured image data 132 associated with the color chart calibration image 125A before causing the gamma calibration image 125B to be displayed on the monitor 135. In other configurations, the calibration tool 120 analyzes the image data at some other time. For example, the calibration tool 120 may analyze the captured image data 132 after obtaining captured image 132 from additional calibration images 125 displayed on the monitor during the calibration sequence 160C.

The analysis performed by the calibration tool 120 may depend on the type of calibration image 125 displayed on the monitor 135. For example, when determining gamma settings, the calibration tool 120 may compare the captured image data 132 of the gamma calibration image 125B to a baseline gamma image to determine whether the gamma for the monitor 135 is set correctly. When determining sharpness settings, the calibration tool 120 may determine if edges of the captured image data 132 are smooth. If the edges are not smooth, the calibration tool 120 might reduce the sharpness calibration setting. Similarly, when determining contrast settings, the calibration tool 120 may determine if each band displayed in a contrast calibration image 125 is distinct from the other bands and the background in the contrast calibration image 125. Generally, the calibration tool 120 performs image processing on the captured image data 132 to determine whether the captured image data 132 approximately matches a baseline image, or other characteristics, that is associated with the calibration setting being tested.

Figure 3:
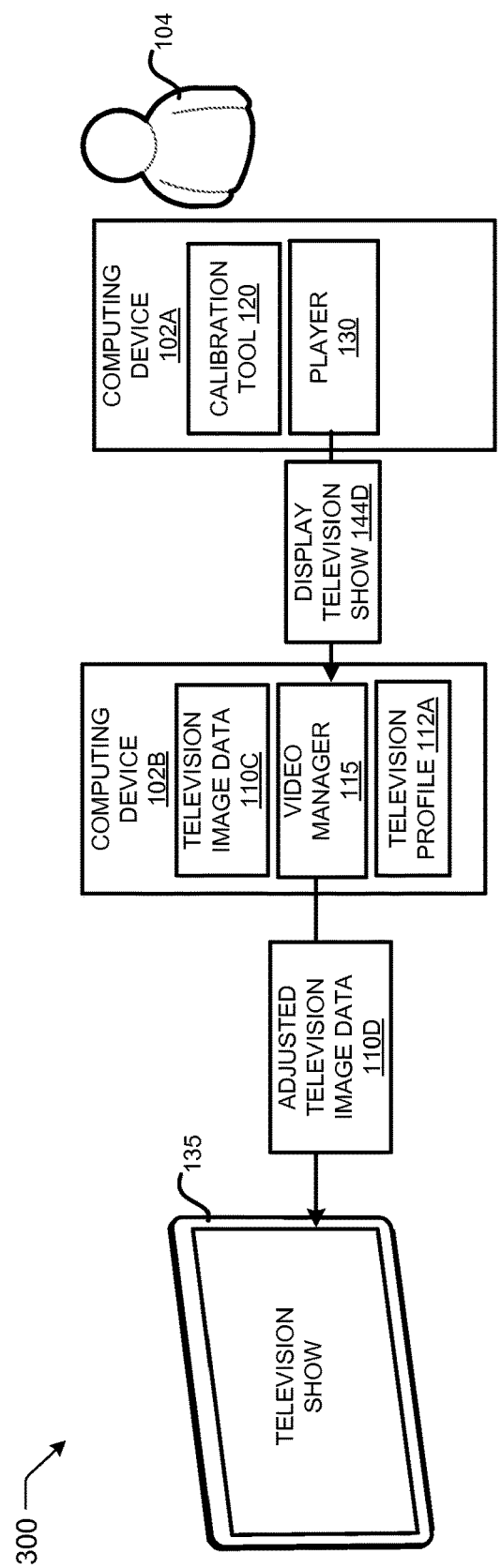
FIG. 3 is a block diagram that shows an example playback sequence wherein a user has selected to display a television show on a monitor.

FIG. 3 is a block diagram 300 that shows an example playback sequence wherein a user 104 has selected to play a television show on the monitor 135. In the example shown in FIG. 3, the user 104 uses the computing device 102A to select a television show to display on the monitor 135. For purposes of illustration, assume that the monitor 135 has previously been calibrated (e.g., using the calibration tool 120) and the television profile 112A has been created and stored on a computing device operative to stream content to the monitor 135. As discussed above, a calibration profile 112, such as the television profile 112A, may include one or more calibration settings 122 used to display content on the monitor 135. According to the current example, the television profile 112A includes calibration settings 122 that are configured for viewing television image data 110C.

In response to receiving a selection from the user 104 to play the television show on the monitor 135, the player 130 may transmit a "display television show" command 144D to the computing device 102B to stream the television image data 110C on the monitor 135. In some configurations, the video manager 115 programmatically adjusts the television image data 110C before displaying the adjusted television image data 110D on the monitor 135. For example, the video manager 115 uses the calibration settings 122 specified by the television profile 112A to programmatically apply different adjustments to the television image data 110C to generate the adjusted television image data 110D that is displayed on the monitor 135. In other configurations, the video manager 115 programmatically adjusts the hardware calibration settings of the monitor and/or the computing device 102B.

Figure 4:
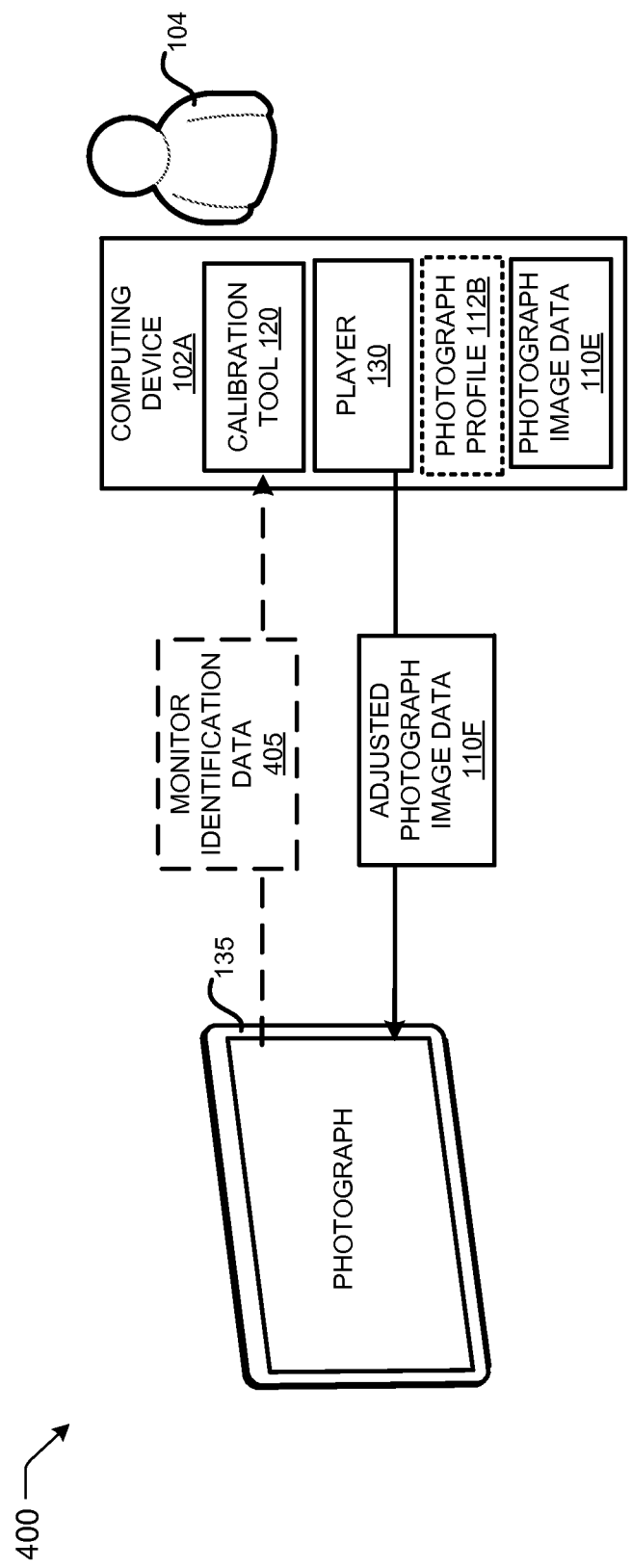
FIG. 4 is a block diagram that shows an example playback sequence wherein a user is displaying a photograph on a monitor.

FIG. 4 is a block diagram 400 that shows an example playback sequence wherein a user 104 is displaying a photograph on the monitor 135. In the example shown in FIG. 4, the user 104 utilizes the computing device 102A to select a photograph to display on the monitor 135.

In some examples, a photographic profile 112B that includes calibration settings 122 has previously been created (e.g., using the calibration tool 120) and stored on the computing device 102A, or at some other location. In other examples, the computing device 102A may not include the photograph profile 112B.

In some configurations, the monitor 135 may provide monitor identification data 405 to the calibration tool 120. The monitor identification data 405 might be provided in response to a query by the calibration tool 120. In other examples, the monitor identification data 405 might be provided in response to the computing device 102A establishing a connection with the monitor 135.

In response to selecting to display the photograph image data 110E on the monitor 135, the player 130, the calibration tool 120, or some or module or component, may adjust (e.g., pre-compensate) the photograph image data 110E to generate adjusted photograph image data 110F before being displayed on the monitor 135. In some examples, the player 130 may utilize the calibration settings 122 specified by the photograph profile 112B to adjust the photograph image data 110E. In other examples, the player 130 may remove a specified portion of the gamma from the photograph image data 110E to generate the adjusted photograph image data 110F. In some configurations, the player 130 may apply a negative gamma correction factor to reduce a portion of the gamma (e.g., de-emphasize) from the photograph image data 110E based on the type of monitor 135 being used to display the photograph. For example, more gamma might be removed from the photograph image data 110E being displayed on a television monitor as compared to an amount of gamma removed before being displayed on a computer monitor. Removing gamma from a photograph before it is displayed on a monitor may compensate for the higher gamma that might be associated with a monitor, such as a television monitor. In some configurations, gamma is removed from the photograph such that when the photograph is displayed on the monitor 135, the gamma value associated with the display of the photograph (or other image data) is approximately one.

In some examples, the video manager 115, the player 130, the calibration tool 120, or some or module or component, may query the monitor 135 for monitor identification data 405 to determine characteristics of the monitor. For instance, the monitor identification data 405 may include data that identifies the type of the monitor 135 (e.g., a brand and model number). The monitor identification data 405 might be used by one or more video sources (e.g., computing device 102A, or computing device 102B). The monitor identification data 405 may include information such as, a manufacturer name, a product type, timings supported by the monitor, a display size of the monitor, luminance data, pixel mapping data for digital displays, and the like. After identifying the type of monitor using the monitor identification data 405, the video manager 115, the calibration tool 120 or some other component might access the default monitor settings 128 in the data store 108A.

Figure 5:
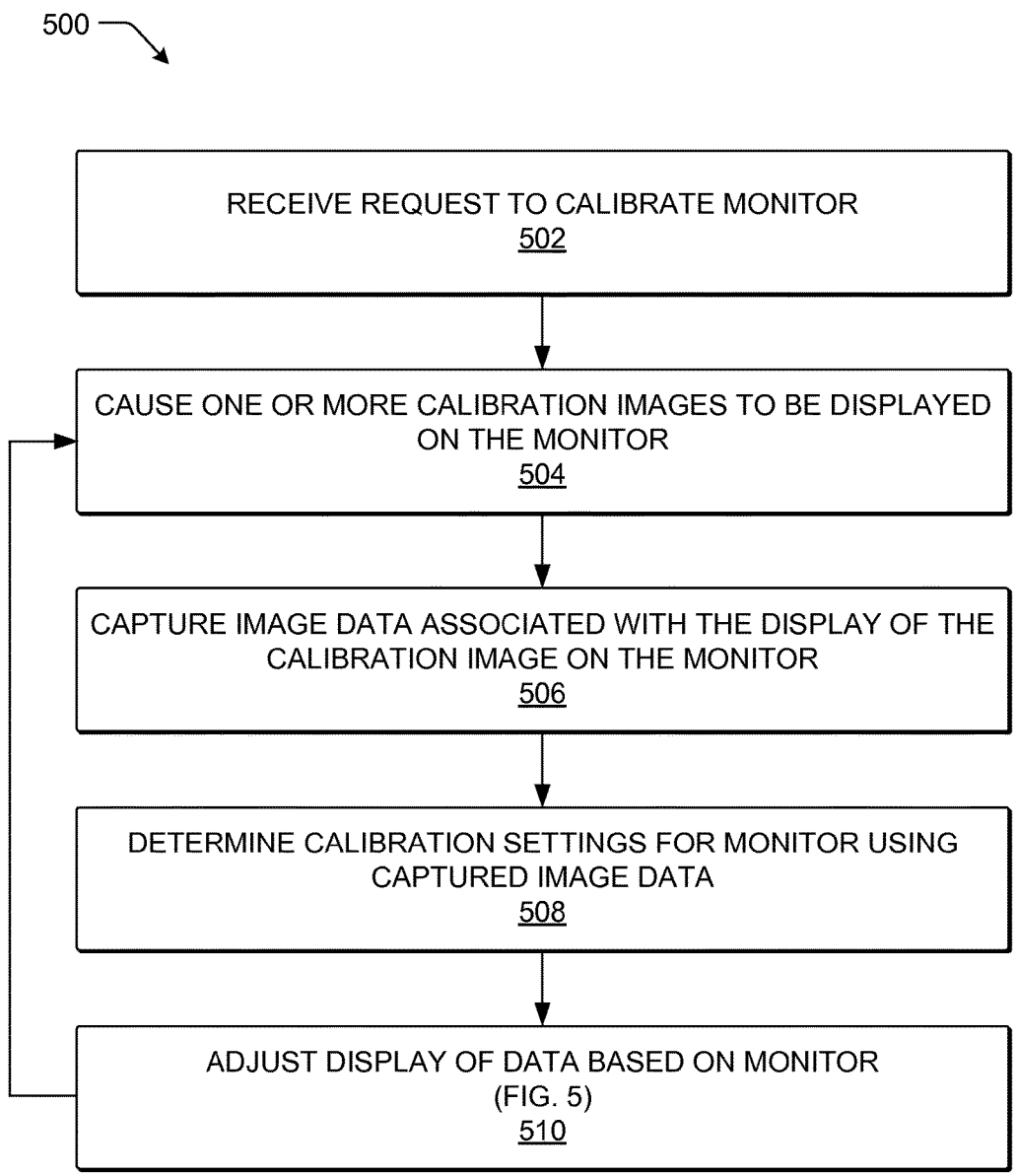
FIG. 5 is an example flow diagram showing an illustrative process for determining calibration settings performed by a calibration tool.
Figure 6:
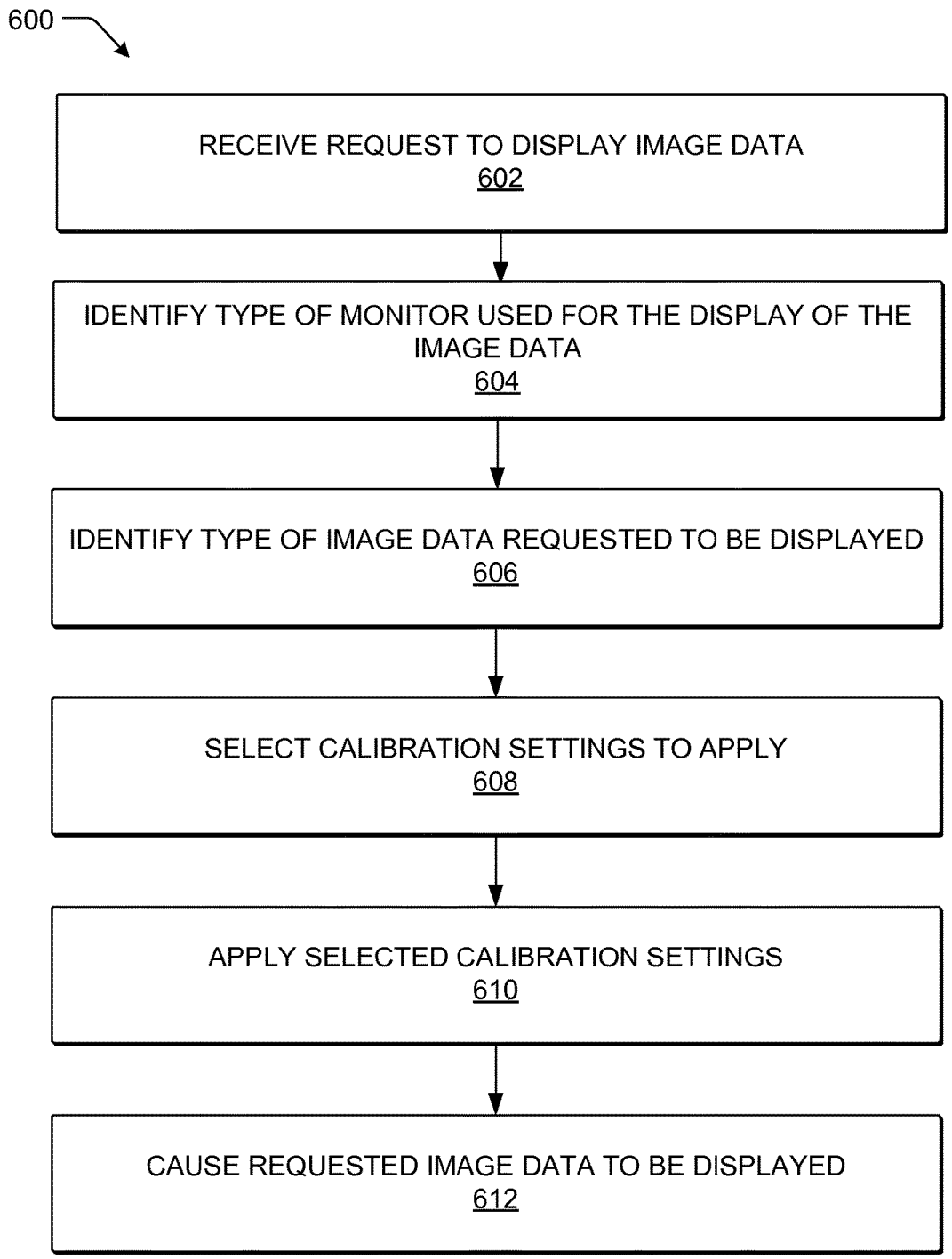
FIG. 6 is an example flow diagram showing an illustrative process for using calibration settings when displaying data on a monitor.

FIGS. 5 and 6 provide example flow diagrams illustrating example processes for implementing the calibrations systems as described above. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 5 is an example flow diagram showing an illustrative process 500 for determining calibration settings performed by a calibration tool, such as the calibration tool 120 of FIG. 1. In this example, the calibration tool 120 may be configured to determine calibration settings 122 for a monitor 135.

At 502, the calibration tool 120 receives a request to calibrate a monitor, such as the monitor 135. As discussed above, a request might be received from a user of a mobile computing device, such as the computing device 102A as illustrated in FIG. 1. According to some examples, the monitor 135 is a television monitor. In other cases, the monitor 135 might be a computer monitor, a projector, or some other type of display device.

At 504, the calibration tool 120 causes one or more calibration images 125 to be displayed on the monitor 135. As discussed above, the calibration tool 120 on the computing device 102A might instruct another computing device (e.g., a set-top box, or a dongle connected to the monitor) to display one or more calibration images 125. In other examples, the calibration tool 120 may instruct the monitor 135 to display the one or more calibration images 125.

At 506, the calibration tool 120 causes image data (e.g., an image) to be captured of the calibration image 125 that is currently displayed on the monitor 135. As discussed above, the calibration tool 120 may cause the camera 124 on the computing device 102A to capture one or more images of the calibration image 125.

At 508, the calibration tool 120 determines calibration settings 122 for the monitor 135 using the captured image data 132. As discussed above, the calibration tool 120 may analyze the captured image data 132 that is associated with the calibration image 125 that is currently displayed on the monitor. According to some configurations, the calibration tool 120 may adjust one or more calibration settings 122 that affect the display of the calibration image 125 on the monitor 135 and then perform another analysis of the captured image data 132 (e.g., capture and analyze another image). As discussed above, the determination of the calibration settings 122 may be repeated for each different calibration image 125 that is displayed during the calibration sequence 160A. In some configurations, the calibration tool 120 may determine that the calibration settings currently associated with the monitor 135 should be reset (e.g., to factory defaults). For example, the calibration tool 120 may determine that adjustments made during the calibration sequence 160A are not resulting in a more calibrated display of content. In this case, the calibration tool 120 might display a message to the user 104 that instructs the user to reset the monitor, or some other display device, to factory settings.

At 510, the display of data on the monitor is adjusted. As discussed above, the calibration tool 120 may cause monitor settings to be adjusted or may adjust the display of the data before the data is displayed on the monitor. For example, in the case of photographs, each photograph may be pre-compensated such that a gamma value of the monitor 135 plus the gamma value of the photograph is zero (or some other determined gamma value). In some examples, the process 500 may return to operation 504 to repeat all or a portion of the operations of process 500.

FIG. 6 is an example flow diagram showing an illustrative process 600 for using calibration settings 122 when displaying data on a monitor 135. The process 600 may be performed by a calibration tool 120, a player 130, or some other component of FIG. 1. In this example, the calibration tool 120 may instruct the player 130 to use the calibration settings 122 when displaying image data on the monitor 135.

At 602, the player 130 receives a request to display image data 110 on the monitor 135. As discussed above, a request might be received from a user 104 of a mobile computing device, such as the computing device 102A as illustrated in FIG. 1.

At 604, the player 130 may identify a type of monitor 135 used for the display of the image data 110. The type of monitor 135 might be a television monitor, a computer monitor, a projector, and the like. In some examples, the player 130 may identify a particular brand and model number associated with the monitor using the monitor identification data 405. After identifying the type of the monitor, the player 130 might access the data store 108 to obtain the default monitor settings 128 for the monitor 135. In some examples, the player 130 might query the monitor 135 or some other computing device 102 to determine the type of monitor being utilized for the display of the image data 110. The type of monitor 135 might be utilized to determine how to adjust the image data 110 before the image data is displayed on the monitor 135. For example, as discussed above, when photographs are being displayed on a television monitor, gamma may be removed from the image data to account for the high gamma typically associated with television monitors.

At 606, the player 130 may identify the type of image data 110 that is requested (or may be requested) to be displayed on the monitor 135. As discussed above, the type of image data 110 might be a photo, television, movie, or some other type of image data. The player 130 might determine the type of image data 110 requested to be displayed based on the player 130 associated with the display of the image data (e.g., a movie player, a television player, or a photograph player 130).

At 608, the player 130 may select the calibration settings 122 to apply based, at least in part, on the type of image data 110 requested to be displayed. As discussed above, different calibration settings 122 might be stored in different calibration profiles 112. In some configurations, the calibration profile 112 that is selected is based on the calibration profile 112 that most closely matches the type of image data identified to be displayed. For example, a calibration profile 112 associated with the display of photographs may be selected when a photograph is requested to be displayed. A calibration profile 112 associated with the display of television shows may be selected when a television show is requested to be displayed. A calibration profile 112 for dimly lit rooms may be selected when a room where the image data is to be displayed is determined to be dimly lit. Other calibration profiles 112 might be selected in other situations. In some configurations, there may be a single calibration profile 112 that is associated with the monitor 135.

At 610, the selected calibration settings 122 are applied. As discussed above, the calibration settings 122 may be applied by the calibration tool 120, or the player 130. For example, the calibration tool 120 may cause the calibration settings 122 of the monitor 135 to be changed or might cause the image data 110 to be adjusted before the image data 110 is displayed on the monitor 135.

At 612, the player 130 or the calibration tool 120 causes the image data 110 to be displayed on the monitor 135. As discussed above, the player 130 may stream the image data 110 to the monitor 135 or to another computing device that may be configured to display the image data 110 on the monitor 135.

Figure 7:
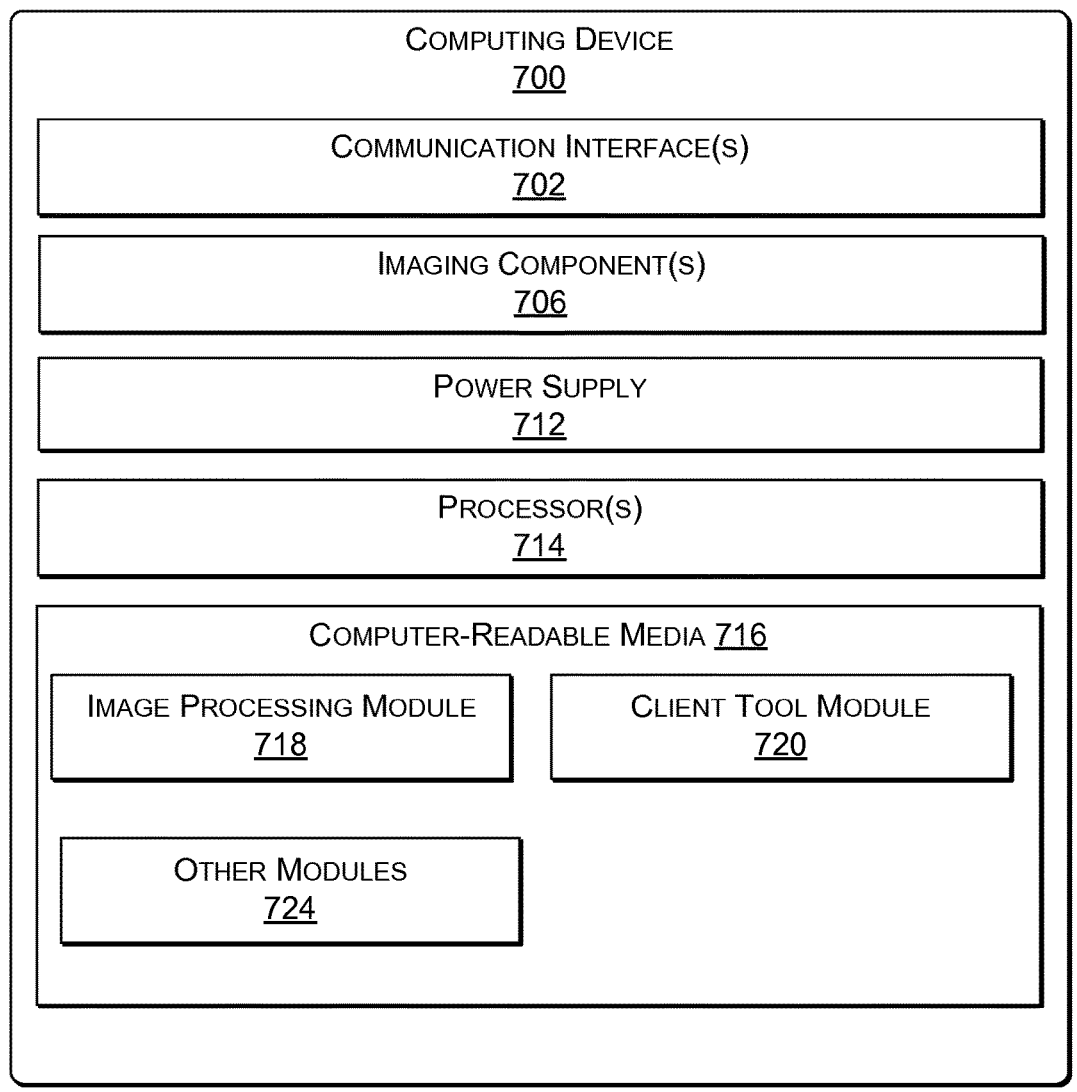
FIG. 7 illustrates an example architecture of a computing device that might be utilized.

FIG. 7 illustrates an example architecture of a computing device, such as the computing device 102A or computing device 102B of FIGS. 1-4. In various examples, the architecture may be illustrative of one or more aspects of the computing device that may be used in determining the calibration settings 122 for displaying content on a monitor 135 as described herein. In some cases, the computing device 700 may be implemented as a standalone device that is configured to perform some or all of the operations described herein. In other cases, the computing device 700 may be configured to communicate with one or more other devices or modules to perform the operations described herein.

Thus, in some implementations, the computing device 700 may include one or more communication interfaces 702 to facilitate communication and/or data transfer (such as the calibration images 125) between one or more networks that include one or more computing devices (such as the computing device 102A and the computing device 102B of FIG. 1).

In some cases, the communication interfaces 702 may also facilitate communication between one or more wireless access points, a master device and/or one or more other computing devices as part of an ad-hoc or home network system. For example, the communication interfaces 702 may support wireless connection, such as radio, Wi-Fi, short-range or near-field networks (e.g., Bluetooth®), infrared signals, and so forth.

The computing device 700 may also include one or more imaging components 706. For example, the imaging component 706 may be one or more cameras 124 that may be configured to capture images of the calibration images 125 that may be displayed on a monitor 135 during a calibration sequence 160A. In some configurations, the imaging component 706 may have a field of view that may be fixed, while in other cases the field of view may be movable and/or zoomable.

In some cases, a plurality of imaging components 706 may be used during the calibration sequence 160A. For example, the computing device 700 may include a three-dimensional camera, an infrared camera, and/or a red-green-blue camera. In one example, the three-dimensional and infrared camera may be configured to capture information related to depths, location, and movement of objects within the field of view. While the red-green-blue camera may be configured to detect edges of objects by identifying changes in color within the field of view.

The computing device 700 includes, or accesses, components such as at least one control logic circuit, central processing unit, one or more processors 714, in addition to one or more computer-readable media 716 to perform the functions of determining the calibration settings 122 that are associated with the monitor 135. Additionally, each of the processors 714 may itself comprise one or more processors or processing cores.

Depending on the configuration of the computing device 700, the computer-readable media 716 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 714.

Several modules such as instruction, data stores, and so forth may be stored within the computer-readable media 716 and configured to execute on the processors 714. Image processing module 718 may be configured to process the image data collected by the image components 706 in order to determine the calibration settings 122 associated with the monitor 135. A collaboration tool module 720 may be stored in the computer-readable media 716 and configured to perform the operations of the calibration tool 120 described herein.

In some cases, the computing device 700 may also include one or more other modules for assisting in the determination of the calibration settings 122 and/or the playback of image data 110 using the calibration settings. For example, one or more operating systems may be stored within the computer-readable media 716.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method to determine a calibration setting, comprising:
   transmitting, from a mobile phone, a calibration test pattern over a wireless network to a television monitor, the calibration test pattern including color bands of different shades of a color, the calibration test pattern being displayed on the television monitor;
   capturing, with a camera of the mobile phone, an image of the calibration test pattern displayed on the television monitor;
   analyzing, on the mobile phone, the image of the calibration test pattern to determine a first color of a first color band and a second color of a second color band;
   determining that the first color of the first color band is substantially the same as the second color of the second color band;
   making an adjustment to a color calibration setting at least in part in response to determining that the first color of the first color band is substantially the same as the second color of the second color band, the color calibration setting used to affect how colors are displayed on the television monitor;
   sending, from the mobile phone, the color calibration setting to the television monitor or to an electronic device connected to the television monitor, the color calibration setting applied by the television monitor or the electronic device to generate adjusted content;
   capturing, with the camera of the mobile phone, an image of the adjusted content displayed on the television monitor;
   analyzing, on the mobile phone, the image of the adjusted content; and
   sending, by the mobile phone and to the television monitor or to the electronic device, an instruction to reset a hardware graphic setting of the television monitor or the electronic device to a factory default, based at least in part on analyzing the image of the adjusted content.

2. The method of claim 1, further comprising:
applying the color calibration setting to the calibration test pattern to produce a modified calibration test pattern;
displaying the modified calibration test pattern on the television monitor;
capturing, with the camera of the mobile phone, an image of the modified calibration test pattern displayed on the television monitor; and
analyzing, on the mobile phone, the image of the modified calibration test pattern to determine whether to make an additional adjustment to the color calibration setting.

3. The method of claim 1, wherein sending the color calibration setting, comprises transmitting, from the mobile phone, a command to set the hardware graphic setting of the television monitor to the color calibration setting or a graphic setting of the electronic device to the color calibration setting.

4. The method of claim 1, further comprising transmitting, from the mobile phone, a second calibration test pattern over the wireless network to the television monitor, wherein transmitting, from the mobile phone, the second calibration test pattern occurs at a predetermined time after transmitting the calibration test pattern;
capturing, with the camera that is a part of the mobile phone, an image of the second calibration test pattern displayed on the television monitor;
analyzing, on the mobile phone, the image of the second calibration test pattern to determine a correction to a calibration setting;
making an adjustment to the calibration setting based at least in part on the correction to the calibration setting;
storing the calibration setting; and
sending, from the mobile phone, the calibration setting to the television monitor or to the electronic device connected to the television monitor, the calibration setting applied by the television monitor or the electronic device to content to generate adjusted content.

5. An apparatus, comprising:
one or more image capture devices configured to capture images;
at least one processor; and
a non-transitory computer-readable storage medium having instructions stored thereon which, when executed on the at least one processor, causes the apparatus to:
cause a first calibration test pattern to be displayed on a monitor;
capture, with at least one of the image capture devices, a first image of the first calibration test pattern displayed on the monitor;
cause, at a predetermined time that is based at least in part on a time associated with the display of the first calibration test pattern, a second calibration test pattern to be displayed on the monitor;
capture, with at least one of the image capture devices, a second image of the second calibration test pattern displayed on the monitor;
analyze the first image of the calibration test pattern to determine that a first color within the first image of the first calibration test pattern is substantially the same as a second color within the first image of the first calibration test pattern;
at least partly in response to determining that the first color within the first image of the first calibration test pattern is substantially the same as the second color, determine one or more first calibration settings associated with display of content on the monitor;
analyze the second image of the second calibration test pattern to determine one or more second calibration settings;
determine that at least one of the one or more first calibration settings or the one or more second calibration settings exceeds a specified threshold; and
cause an instruction to be provided to reset a hardware graphics setting of the monitor or of an electronic device coupled to the monitor to a factory default at least partly in response to the determination that the at least one of the one or more first calibration settings or the one or more second calibration settings exceeds the specified threshold.

6. The apparatus of claim 5, wherein the apparatus is configured to send the first calibration test pattern to the electronic device coupled to the monitor, wherein the electronic device causes display of the first calibration test pattern on the monitor.

7. The apparatus of claim 5, wherein the apparatus is further configured to send the one or more first calibration settings to the monitor, wherein the one more first calibration settings are used to modify the one or more hardware graphics settings of the monitor.

8. The apparatus of claim 5, wherein the one or more first calibration settings are used to modify the one or more hardware graphics settings of the monitor.

9. The apparatus of claim 5, wherein the apparatus is further configured to:
modify the first calibration test pattern using the one or more first calibration settings to generate a modified calibration test pattern; and
send the modified calibration test pattern to the monitor.

10. The apparatus of claim 5, wherein the apparatus is further configured to generate a calibration profile that includes the one or more first calibration settings and the one or more second calibration settings, the calibration profile used by the apparatus for display of the content.

11. The apparatus of claim 5, wherein the one or more second calibration settings comprise one or more of a brightness setting, a contrast setting, a gamma setting, a color saturation setting, a color tint setting, a scaling setting, or a resolution setting.

12. The apparatus of claim 5, wherein analyze the second image of the second calibration test pattern comprises comparing the second image of the second calibration test pattern to the second calibration pattern to determine differences between the second image of the calibration test pattern and the second calibration test pattern and determine one or more of a gamma setting, a brightness setting, a contrast setting, or a color setting based on the differences.

13. The apparatus of claim 5, wherein the computer-readable storage medium stores further computer-executable instructions that cause the apparatus to transmit the one or more first calibration settings to another computing device coupled to the monitor, the other computing device utilizing the one or more first calibration settings for display of the content on the monitor.

14. A method comprising:
causing a display of a first calibration test pattern on a monitor;
capturing a first image of the first calibration test pattern displayed on the monitor;

causing, at a predetermined time based at least in part on a time of display of the first calibration test pattern, a display of a second calibration test pattern on the monitor;

capturing a second image of the second calibration test pattern displayed on the monitor;

analyzing the first image of the first calibration test pattern and analyzing the second image of the second calibration test pattern to determine one or more calibration settings associated with the monitor;

modifying one or more of the first calibration test pattern or the second calibration test pattern, using the one or more calibration settings, to generate a modified calibration test pattern;

sending the modified calibration test pattern to the monitor;

determining that sending the modified calibration test pattern to the monitor did not result in a calibrated monitor; and sending an instruction to reset a hardware graphic setting of the monitor to a factory default, wherein sending the instruction is based at least in part on determining that sending the modified calibration test pattern to the monitor did not result in the calibrated monitor.

15. The method of claim 14, further comprising setting a graphics setting of a computing device using the one or more calibration settings.

16. The method of claim 14, further comprising causing one or more hardware graphic settings of the monitor to be adjusted using the one or more calibration settings.

17. The method of claim 14, further comprising applying the one or more calibration settings to content using a set-top box that is connected to the monitor.

18. The method of claim 14, further comprising generating a calibration profile that includes the one or more calibration settings.

19. The method of claim 14, wherein the one or more calibration settings include a gamma setting, a brightness setting, a contrast setting, a color setting, and a scale setting.

20. The method of claim 1, further comprising determining that the color calibration setting did not result in a calibrated television monitor, and wherein the sending the instruction to reset the hardware graphic setting of the television monitor to the factory default is at least based in part on the determining that the color calibration setting did not result in the calibrated television monitor.

* * * * *